(12) United States Patent
Hasegawa

(10) Patent No.: US 7,554,724 B2
(45) Date of Patent: Jun. 30, 2009

(54) MICROSCOPE LENS BARREL

(75) Inventor: Kazuhiro Hasegawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/970,574

(22) Filed: Jan. 8, 2008

(65) Prior Publication Data

US 2008/0180795 A1    Jul. 31, 2008

(30) Foreign Application Priority Data

Jan. 25, 2007   (JP) ............................. 2007-015189

(51) Int. Cl.
*G02B 21/00* (2006.01)
(52) U.S. Cl. ................................... 359/384
(58) Field of Classification Search ................ 359/384, 359/368, 431, 834
See application file for complete search history.

(56) References Cited

U.S. PATENT DOCUMENTS

| | | | | |
|---|---|---|---|---|
| 2,058,676 | A * | 10/1936 | Foster | 359/431 |
| 2,660,090 | A * | 11/1953 | Leitz, Jr. et al. | 359/375 |
| 2,901,943 | A * | 9/1959 | Tackaberry | 359/377 |
| 4,720,178 | A | 1/1988 | Nishioka et al. | |
| 4,783,160 | A | 11/1988 | Tanaka | |
| 5,764,408 | A | 6/1998 | Otaki | |
| 5,907,432 | A * | 5/1999 | Hayasaka | 359/384 |
| 6,097,538 | A | 8/2000 | Watanabe et al. | |
| 6,327,079 | B1 * | 12/2001 | Namii et al. | 359/376 |
| 2003/0133187 | A1 * | 7/2003 | Schmidt et al. | 359/376 |
| 2004/0190128 | A1 * | 9/2004 | Hund et al. | 359/368 |

FOREIGN PATENT DOCUMENTS

| | | |
|---|---|---|
| DE | 3529026 A1 | 2/1986 |
| JP | 08-043740 A | 2/1996 |
| JP | 08-278448 A | 10/1996 |
| JP | 2000-098237 A | 4/2000 |

OTHER PUBLICATIONS

Extended European Search Report dated Jun. 4, 2008, issued in a counterpart European Application.

* cited by examiner

*Primary Examiner*—Alessandro Amari
*Assistant Examiner*—Mark Consilvio
(74) *Attorney, Agent, or Firm*—Frishauf, Holtz, Goodman & Chick, P.C.

(57) ABSTRACT

Provided is a microscope lens barrel including a collecting lens and a deflecting optical system. The collecting lens emits observation light toward the deflecting optical system. The deflecting optical system includes a first reflecting plane, a second reflecting plane, a third reflecting plane, and a fourth reflecting plane, and deflects the observation light emitted from the collecting lens. The first reflecting plane transmits the observation light incident from one direction and reflects the observation light incident at an angle from another direction. The second reflecting plane reflects the observation light transmitted through the first reflecting plane and makes the reflected observation light incident on the first reflecting plane at an angle. The third reflecting plane reflects the observation light reflected by the first reflecting plane in a direction of the second reflecting plane. The fourth reflecting plane reflects the observation light reflected by the third reflecting plane in a direction perpendicular or substantially perpendicular to an optical axis of the collecting lens in a direction from the optical axis of the collecting lens toward the third reflecting plane.

5 Claims, 7 Drawing Sheets

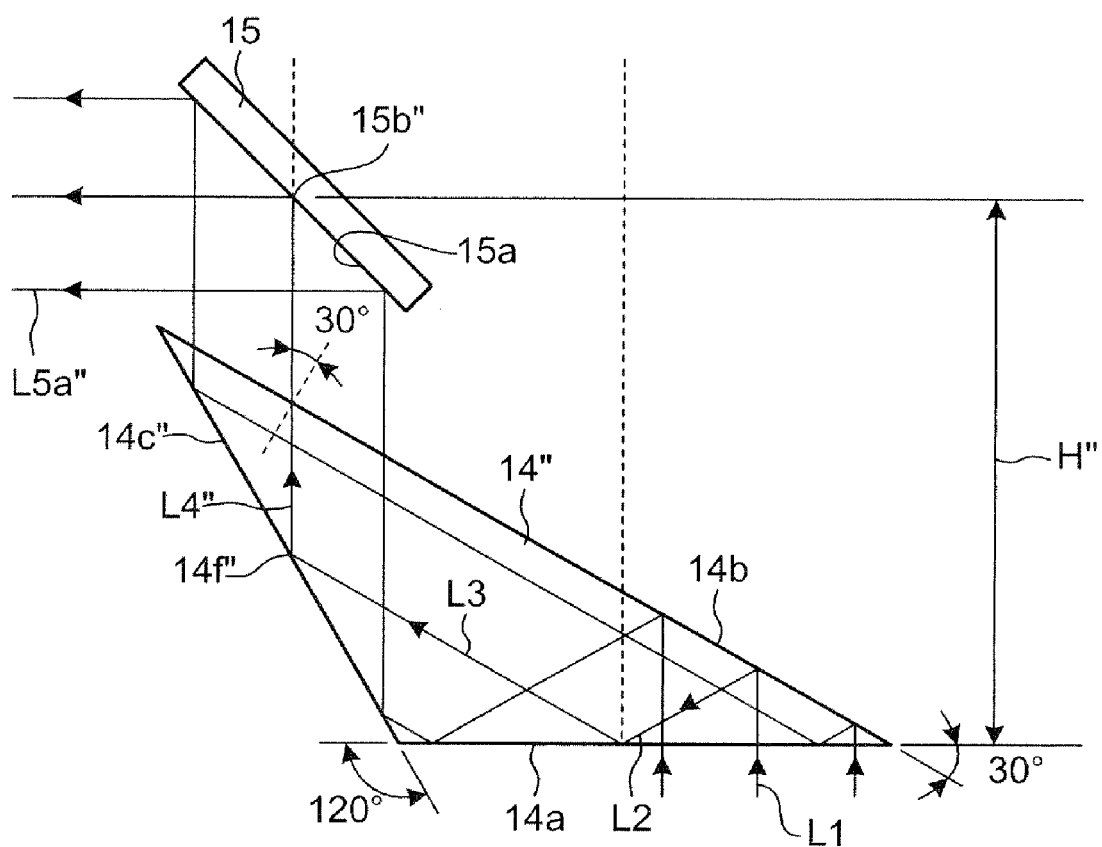

MICROSCOPE LENS BARREL

CROSS-REFERENCE TO RELATED APPLICATIONS

This application is based upon and claims the benefit of priority from Japanese Patent Application No. 2007-015189, filed Jan. 25, 2007, the entire contents of which are incorporated herein by reference.

BACKGROUND OF THE INVENTION

1. Field of the Invention

The present invention relates to a microscope lens barrel including a collecting lens and a deflecting optical system which deflects observation light emitted from the collecting lens.

2. Description of the Related Art

In microscopic observation in general, it is regarded as ergonomically desirable that an observer looks into the microscope at a nearly horizontal depression angle. It is said that, when the observer looks down into an eyepiece angled in a horizontal direction or slightly above the horizontal direction, the observer experiences less physical tension and feels less tired after long hours of microscopic observation. Conventional microscopes arrange a microscope lens barrel housing the eyepiece at such an angle that the depression angle of the line of vision of the observer is substantially horizontal. Further, in many conventionally-proposed microscope designs, users can adjust the arrangement appropriately so as to make the depression angle suitable for his/her constitution and the like.

In a lens barrel optical system described in Japanese Patent Application Laid-Open No. H8-278448, light emitted from an objective lens enters a collecting lens which emits the light vertically upward. A prism receives the light from the collecting lens and emits the light downward. A rotatably-arranged mirror reflects and guides the light to a binocular lens barrel unit. In this lens barrel optical system, linked rotations of the mirror and the binocular lens barrel unit enable flexible adjustment of the depression angle of the line of vision (i.e., depression angle). In this lens barrel optical system, the light emitted from the collecting lens is guided to the binocular lens barrel unit via a relay lens.

In a binocular lens barrel described in Japanese Patent Application Laid-Open No. H8-43740, the light emitted from a collecting lens is guided to an eyepiece via rotatably-arranged mirror and prisms. In this binocular lens barrel, the linked rotations of the mirror, the prisms, and the eyepiece realize a flexible adjustment of the depression angle.

In a depression-angle-variable lens barrel described in Japanese Patent Application Laid-open No. 2000-98237, light emitted from an objective lens comes into a collecting lens via a rotatably-arranged mirror. Light emitted from the collecting lens is guided to a binocular lens barrel unit via prisms. In this depression-angle-variable lens barrel, linked rotations of the mirror, the collecting lens, the prisms, and the binocular lens barrel unit realize flexible adjustment of the depression angle.

On the other hand, an eyepoint of an observer looking into an eyepiece, in other words, the position of the exit pupil of the eyepiece should not be too high so that the observer does not need to take an uncomfortable position during microscopic observation (for example, in a stretched state). Microscope apparatuses of today, however, need to accommodate various intermediate lens barrels such as a projecting tube housing an epi-illumination system between a microscope body and a microscope lens barrel. Such necessity tends to raise the eyepoint in the microscope apparatus. Therefore, in the microscope lens barrel as a single unit, desirably the eyepoint is lowered as far as possible so that the eyepoint is approximately at the same level as an arranged position of the collecting lens.

In a lens barrel optical system described in Japanese Patent Application Laid-Open No. H8-278448, light emitted vertically upward from the collecting lens is returned downward by the prism. Therefore, the binocular lens barrel unit can be arranged at a low position, and the eyepoint (i.e., eye level) at approximately the same level as the collecting lens.

In the lens barrel optical system described in Japanese Patent Application Laid-Open No. H8-278448, however, since the light emitted from the collecting lens is returned downward, the mirror which reflects the returned light and a mechanism which holds and rotates the mirror must be arranged below the collecting lens. Then, in order to prevent vertical interference between the portion arranged below the collecting lens and the microscope body, the intermediate lens barrels, or the like, the microscope lens barrel as a whole sometimes must be placed at a higher position than is generally arranged. In brief, even when the eyepoint can be made substantially equal to the level of the collecting lens in the microscope lens barrel, the eyepoint of the microscope as a whole in which the microscope lens barrel is mounted may not be sufficiently low. Further, in the lens barrel optical system described in Japanese Patent Application Laid-Open No. H8-278448, the light emitted from the collecting lens is guided to the binocular lens barrel unit via the relay lens. Therefore, the lens barrel optical system includes a large number of elements which makes the overall configuration of the lens barrel optical system bulkier and also pushes up the manufacturing cost.

Still further, in a binocular lens barrel described in Japanese Patent Application Laid-Open No. H8-43740 and the depression-angle-variable lens barrel described in Japanese Patent Application Laid-Open No. 2000-98237, the mirror which rotates to adjust the depression angle is arranged in front of or immediately next to the collecting lens. Therefore, many optical elements arranged in the lens barrel have to rotate in conjunction with the mirror. Such rotating mechanism as a whole becomes larger and heavier. Hence, the overall rotating mechanism must have a rigid configuration to increase its rigidity. Such requirements complicate the configuration of the lens barrel, and push up the manufacturing cost.

On the other hand, in the lens barrel described in Japanese Patent Application Laid-Open No. 2000-98237, the collecting lens is difficult to share between two separate light paths, namely, a light path for camera observation of an image of the specimen and a light path for visual observation via the eyepiece (in other words, a light path for eyepiece). In the lens barrel described in Japanese Patent Application Laid-Open No. H8-43740, it is possible to use the collecting lens for both the light path for camera observation and the light path for eyepiece by, for example, making the rotatably-arranged mirror a half mirror and arranging the light path for camera observation on the half mirror. In this arrangement, however, the rotation of the mirror can cause lateral displacement of the light path for camera observation.

SUMMARY OF THE INVENTION

An object of the present invention is at least to solve the problems as described above.

A microscope lens barrel according to one aspect of the present invention includes a collecting lens, and a deflecting optical system that deflects observation light emitted from the collecting lens. The deflecting optical system includes a first reflecting plane that transmits the observation light incident from one direction and reflects the observation light incident at an angle from another direction, a second reflecting plane that reflects the observation light transmitted through the first reflecting plane and makes the reflected observation light incident on the first reflecting plane at an angle, a third reflecting plane that reflects the observation light reflected by the first reflecting plane in a direction of the second reflecting plane, and a fourth reflecting plane that reflects the observation light reflected by the third reflecting plane in a direction perpendicular or substantially perpendicular to an optical axis of the collecting lens and in a direction from the optical axis of the collecting lens to the third reflecting plane.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 4A, 4B, and 4C are diagrams for explaining positional relations between a deflecting prism and a plane mirror shown in FIG. 3;

DETAILED DESCRIPTION OF THE PREFERRED EMBODIMENTS

Exemplary embodiments of the present invention will be described hereinbelow with reference to the accompanying drawings.

Figure 1:
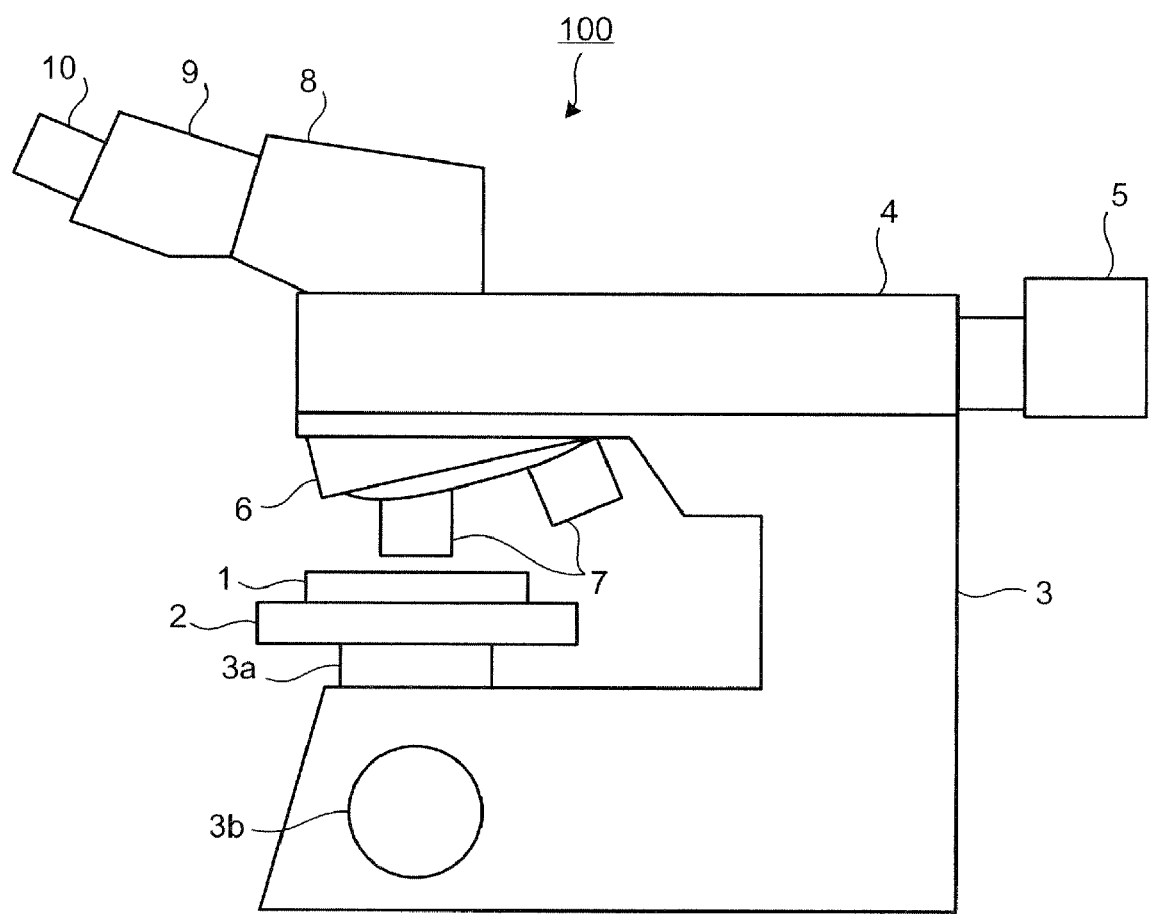
FIG. 1 is a schematic diagram of a microscope including a microscope lens barrel according to a first embodiment of the present invention.

A microscope lens barrel and a microscope according to a first embodiment of the present invention will be described. FIG. 1 shows a schematic external configuration of the microscope lens barrel and the microscope according to the first embodiment. A microscope 100 shown in FIG. 1 includes a stage 2 on which a specimen 1 is placed, a microscope body 3 which supports the stage 2 via a stage holder 3a, an epi-illumination projecting tube 4 which is arranged above the microscope body 3 and houses inside an illumination optical system not shown, and a lamp housing 5 which is attached to a back-end portion (i.e., right-end portion in FIG. 1) of the epi-illumination projecting tube 4 and houses inside an illumination light source not shown.

Further, the microscope 100 includes a revolver 6 which is arranged at a front-end portion (i.e., left-side portion in FIG. 1) of the microscope body 3, plural objective lenses 7 which are attached to the revolver 6 interchangeably, and a lens barrel 8 which is mounted on the epi-illumination projecting tube 4 as the microscope lens barrel. On a front side (i.e., left-side surface in FIG. 1) of the lens barrel 8, a binocular unit 9 including a pair of eyepieces 10 is arranged. The binocular unit 9 is rotatable relative to the lens barrel 8 in a plane corresponding to the paper surface of FIG. 1 as described later.

The stage holder 3a moves vertically in conjunction with a rotating operation of a focus knob 3b projecting from a side surface of the microscope body 3, and thereby moves the specimen 1 vertically with the stage 2. As the specimen 1 moves, the objective lens 7 is focused on the specimen 1 (focusing). One of the objective lenses 7 is selectively arranged above the specimen 1 according to a rotating operation of the revolver 6. The epi-illumination projecting tube 4, which serves as an intermediate lens barrel, irradiates the specimen 1 with illumination light supplied through the objective lens 7 from the lamp housing 5 using the illumination optical system housed therein. The objective lens 7, in cooperation with an imaging lens described later inside the lens barrel 8, forms an observation image of the specimen 1 illuminated by the illumination optical system. The objective lens 7 collects observation light emitted from each point of the specimen 1 and emits the collected light as parallel light to the imaging lens. The imaging lens collects the observation light emitted from the objective lens 7 to form the observation image.

Figure 2:
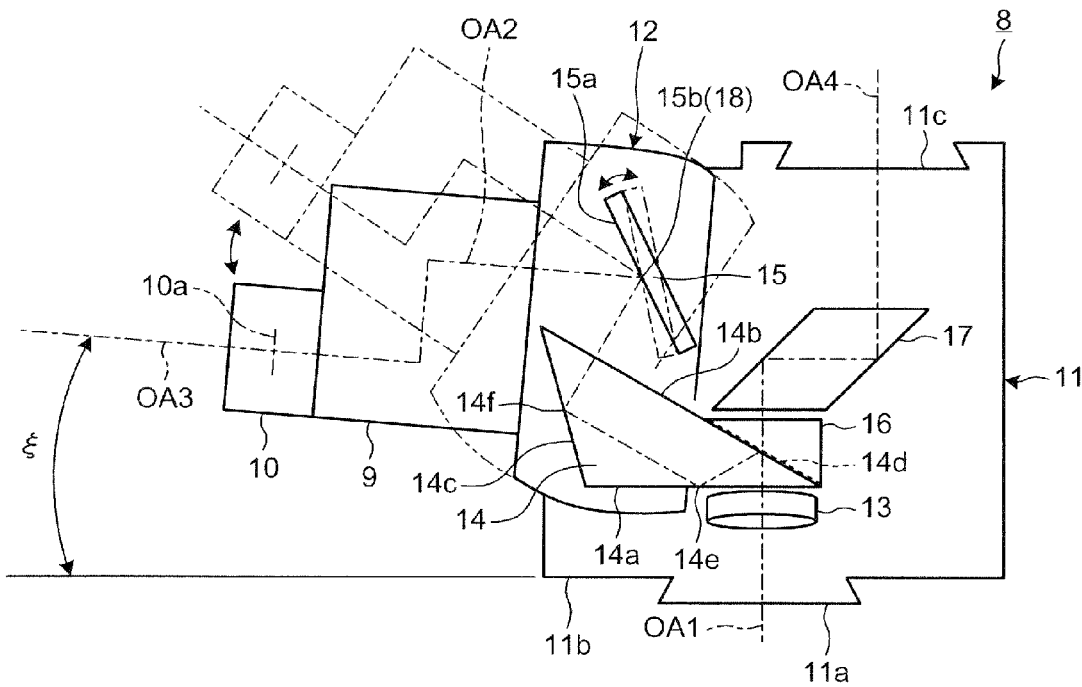
FIG. 2 is a schematic diagram of an internal configuration of the microscope lens barrel according to the first embodiment of the present invention.

The lens barrel 8 which serves as the microscope lens barrel according to the first embodiment will be described in detail. FIG. 2 shows an internal configuration of the lens barrel 8. As shown in FIG. 2, the lens barrel 8 mainly includes a fixed unit 11 and a movable unit 12. The fixed unit 11 is fixed onto the epi-illumination projecting tube 4 or an intermediate lens barrel other than the epi-illumination projecting tube 4 by an attachment 11a which is formed like a dovetail, for example. The movable unit 12 is arranged on a front side of the fixed unit 11. The movable unit 12 is movable relative to the fixed unit 11 within a plane corresponding to the paper surface of FIG. 2. On a front surface of the movable unit 12, the binocular unit 9 having a pair of eyepieces 10 is attached. In the lens barrel 8, the movable unit 12 and the binocular unit 9 rotate in conjunction with each other to change a depression angle ξ of a line of vision.

Here, the depression angle ξ is an angle of the binocular unit 9 and the eyepiece 10 above the horizontal plane. The depression angle ξ corresponds to an angle between optical axes OA2 and OA3 of the light coming into and coming out of the binocular unit 9 and an attachment surface 11b of the fixed unit 11 which is attached to the epi-illumination projecting tube 4 or the like. Here, the optical axes OA2 and OA3 are parallel with each other. In the lens barrel 8, the depression angle ξ is set changeably at a horizontal angle or an angle close to the horizontal angle. Specifically, the depression angle ξ is set freely within the range of 0° to 20°, for example.

The fixed unit 11 houses an imaging lens 13, a deflecting prism 14, a beam-splitting prism 16, and a rhomboid prism 17 inside. The movable unit 12 houses a plane mirror 15 inside. The imaging lens 13, which serves as a collecting lens, collects the observation light coming along an optical axis OA1 from the objective lens 7 and emits the collected light. The deflecting prism 14 has a triangular cross-section in a plane corresponding to the paper surface of FIG. 2 surrounded by a first reflecting plane 14a, a second reflecting plane 14b, and a third reflecting plane 14c. In the deflecting prism 14, the observation light emitted from the imaging lens 13 passes through the first reflecting plane 14a and is reflected and transmitted, in a predetermined ratio, by the second reflecting plane 14b on which a partial reflecting film 14d is applied.

The observation light reflected by the second reflecting plane 14b is incident on the first reflecting plane 14a at an angle, and reflected totally. The totally-reflected observation light is further reflected by a highly reflective film on the third reflecting plane 14c, and is transmitted through the second reflecting plane 14b to be incident on the plane mirror 15. The plane mirror 15 reflects the observation light reflected by the third reflecting plane 14c on a reflecting plane 15a which serves as a fourth reflecting plane, and makes the reflected observation light incident on the binocular unit 9. Thus, the deflecting prism 14 and the plane mirror 15, which serve as the deflecting optical system, form a light path for visual observation along which a part of the observation light emitted from the imaging lens 13 is deflected to be guided to the binocular unit 9 and the eyepiece 10.

On the other hand, the observation light transmitted through the second reflecting plane 14b is incident on the beam-splitting prism 16 via the partial reflecting film 14d. The beam-splitting prism 16 is made of a material having the same refractive index as that of the deflecting prism 14. The beam-splitting prism 16 is bonded onto the second reflecting plane 14b via the partial reflecting film 14d. Therefore, the observation light transmitted through the second reflecting plane 14b comes into the beam-splitting prism 16 along the optical axis OA1 without being refracted.

The observation light coming into the beam-splitting prism 16 passes through the beam-splitting prism 16 and the rhomboid prism 17, and is emitted in a direction of a camera attachment 11c. The rhomboid prism 17 has a parallelogrammatic cross-section in a plane corresponding to the paper surface of FIG. 2. The rhomboid prism 17 shifts the observation light coming along the optical axis OA1 to an optical axis OA4 and emits the resulting light. The optical axis OA4 corresponds to an optical axis of a camera not shown attached to the camera attachment 11c. The beam-splitting prism 16 and the rhomboid prism 17 form the light path for camera observation for a camera attached to the camera attachment 11c.

The imaging lens 13 forms an observation image of the specimen 1 on a front focal plane 10a of the eyepiece 10 and on an imaging plane of a camera (not shown) respectively on the light path for visual observation and the light path for camera observation. The imaging plane of the camera is arranged at a predetermined distance from the camera attachment 11c on the optical axis OA4.

Figure 3:
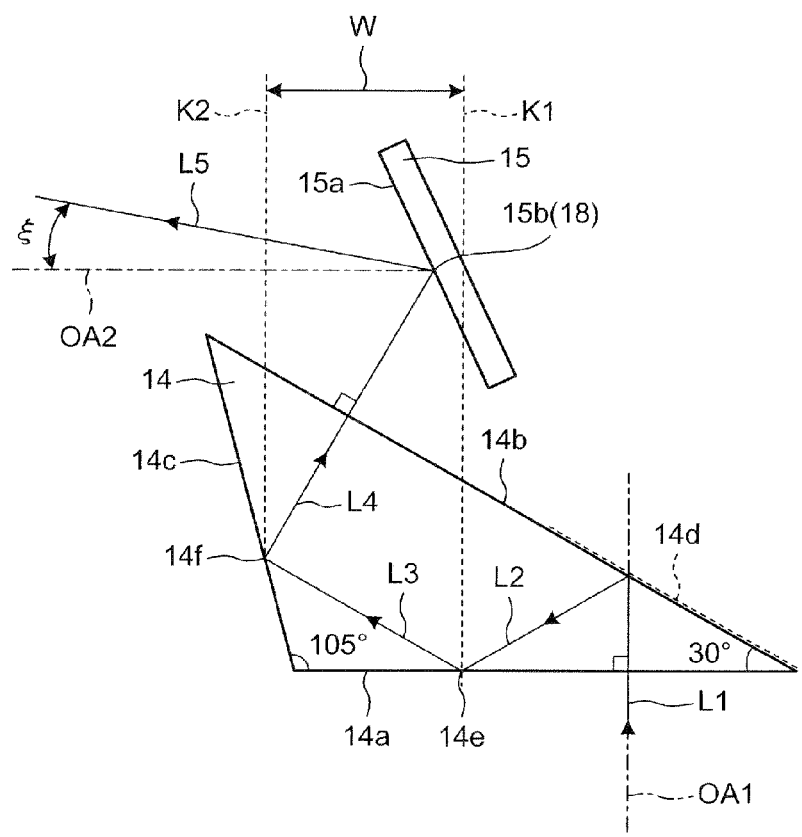
FIG. 3 is a diagram of a configuration of a deflecting optical system shown in FIG. 2.

The deflecting prism 14 and the plane mirror 15 serving as the deflecting optical system will be described in detail. FIG. 3 shows configurations of the deflecting prism 14 and the plane mirror 15. As shown in FIG. 3, the first reflecting plane 14a of the deflecting prism 14 is arranged perpendicularly to the optical axis OA1. An angle between the second reflecting plane 14b and the first reflecting plane 14a is 30°, whereas an angle between the third reflecting plane 14c and the first reflecting plane 14a is 105°. The first to the third reflecting planes 14a to 14c and the reflecting plane 15a of the plane mirror 15 are each perpendicular to a plane corresponding to the paper surface of FIG. 3. The optical axis OA1 runs along the paper surface of FIG. 3. Further, the plane mirror 15 is rotatable around a rotation axis 18 arranged on the reflecting plane 15a perpendicularly to the paper surface of FIG. 3.

An axial observation light L1 of the observation light runs along the optical axis OA1. The axial observation light L1 is transmitted through the first reflecting plane 14a perpendicularly to further come into the second reflecting plane 14b. The second reflecting plane 14b reflects the axial observation light L1 at a predetermined reflectance ratio and makes the reflected light as an axial observation light L2 incident on the first reflecting plane 14a at an angle. The first reflecting plane 14a reflects the axial observation light L2 totally, and makes the totally-reflected light as an axial observation light L3 incident on the third reflecting plane 14c. The third reflecting plane 14c reflects the axial observation light L3 and makes the reflected light as an axial observation light L4 incident on the second reflecting plane 14b perpendicularly and transmitted through the second reflecting plane 14b. The axial observation light L3 is parallel with the second reflecting plane 14b.

The reflecting plane 15a which serves as the fourth reflecting plane reflects the axial observation light L4 transmitted through the second reflecting plane 14b in a direction perpendicular, or substantially perpendicular to the optical axis OA1 of the imaging lens 13, in other words in a horizontal direction or a substantially horizontal direction. The reflected light is emitted as an axial observation light L5. An angle of emission of the axial observation light L5 is determined by a rotating position of the plane mirror 15. The plane mirror 15 is linked with the binocular unit 9 via an interlocking rotation mechanism (not shown) so that the plane mirror 15 rotates around the rotation axis 18 in the same direction as the rotation of the binocular unit 9 by half the amount of rotation of the binocular unit 9. Further, the rotation axis 18 is arranged on a reflecting point 15b of the axial observation light L4 on the reflecting plane 15a.

A series of reflections of the axial observation lights L1 to L4 by the first to the third reflecting planes 14a to 14c and the reflecting plane 15a is carried out within the plane corresponding to the paper surface of FIG. 3, in other words, within a deflection plane extending along the optical axis OA1 of the imaging lens 13 and perpendicular to the second reflecting plane 14b. In other words, the deflecting prism 14 and the plane mirror 15 serving as the deflecting optical system deflect the observation light coming along the optical axis OA1 from the objective lens 7 so that the deflected light runs along the deflection plane at a horizontal or a substantially horizontal variable depression angle and comes into the binocular unit 9.

The plane mirror 15 is arranged so as to reflect the axial observation light L4 in a direction perpendicular to the optical axis OA1 of the imaging lens 13 within a range W between a reflecting point 14e of the axial observation light L2 on the first reflecting plane 14a and a reflecting point 14f of the axial observation light L3 on the third reflecting plane 14c. In other words, the reflecting point 15b of the axial observation light L4 on the reflecting plane 15a is arranged within the range W.

Draw a first imaginary line K1 as a straight line which is parallel to the optical axis OA1 and passes through the reflecting point 14e of the axial observation light L2 on the first reflecting plane 14a, and a second imaginary line K2 as a straight line which is parallel to the optical axis OA1 and passes through the reflecting point 14f of the axial observation light L3 on the third reflecting plane 14c. The plane mirror 15

(or more specifically, the reflecting point 15*b* on the plane mirror 15) is arranged so that the axial observation light L4 is reflected at a point within the range W between the first imaginary line K1 and the second imaginary line K2. Further, the plane mirror 15 is arranged opposite the first reflecting plane 14*a* with respect to the second reflecting plane 14*b*.

Figure 4A:
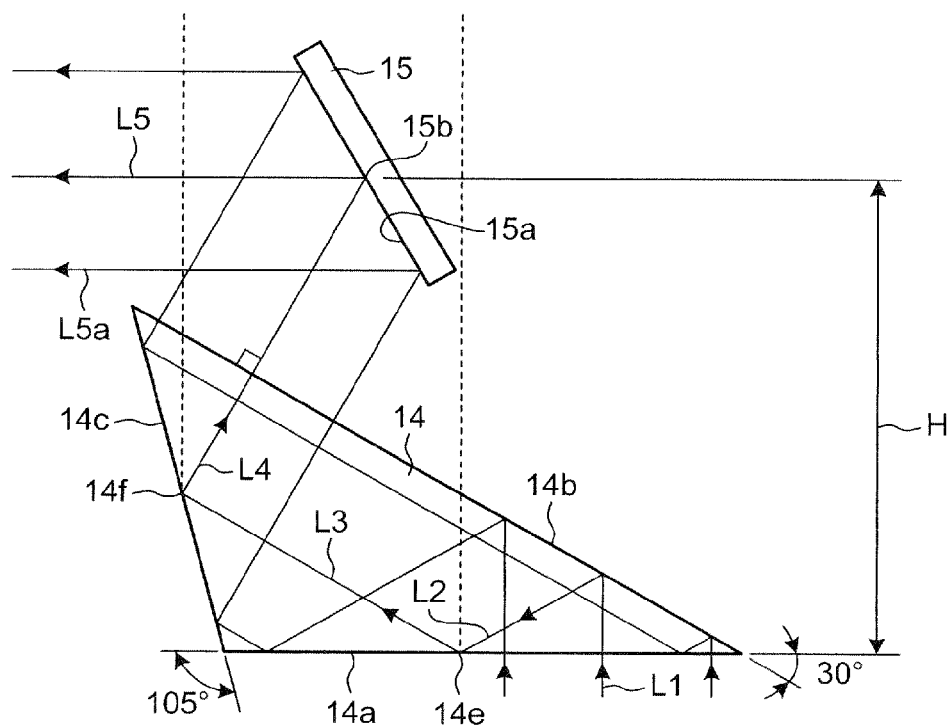

Further, the plane mirror 15 is arranged at such a position that a lower edge L5*a* of the light flux of the observation light reflected by the reflecting plane 15*a* is not eclipsed (shaded) by an upper edge and the like of the deflecting prism 14 as shown in FIG. 4A.

Observation light emitted from the imaging lens 13, transmitted through the first reflecting plane 14*a*, and reflected by the second reflecting plane 14*b* comes into the first reflecting plane 14*a* at an angle and totally reflected by the first reflecting plane 14*a*. A light flux of the observation light coming into the first reflecting plane 14*a* is overlapped with a light flux of the observation light totally reflected by the first reflecting plane 14*a*. This overlapping of the observation lights contributes to the downsizing by shortening the light path length.

The deflecting prism 14 and the plane mirror 15 configured as described above as the deflecting optical system can shorten the light path length necessary for the observation light emitted from the imaging lens 13 to reach the binocular unit 9 while suppressing a height H of the reflecting point 15*b* on the reflecting plane 15*a* from the first reflecting plane 14*a*. The deflecting prism 14 and the plane mirror 15 as a whole are configured in a simple and compact manner. Because of this compact configuration of the deflecting optical system, the lens barrel 8 can lower the height of the eyepoint in the eyepiece 10 and guide the observation light to the binocular unit 9 using the conventional, standard imaging lens 13 (such as a lens having a focal distance of 160 to 200 mm) without the need of a relay lens.

Figure 4B:
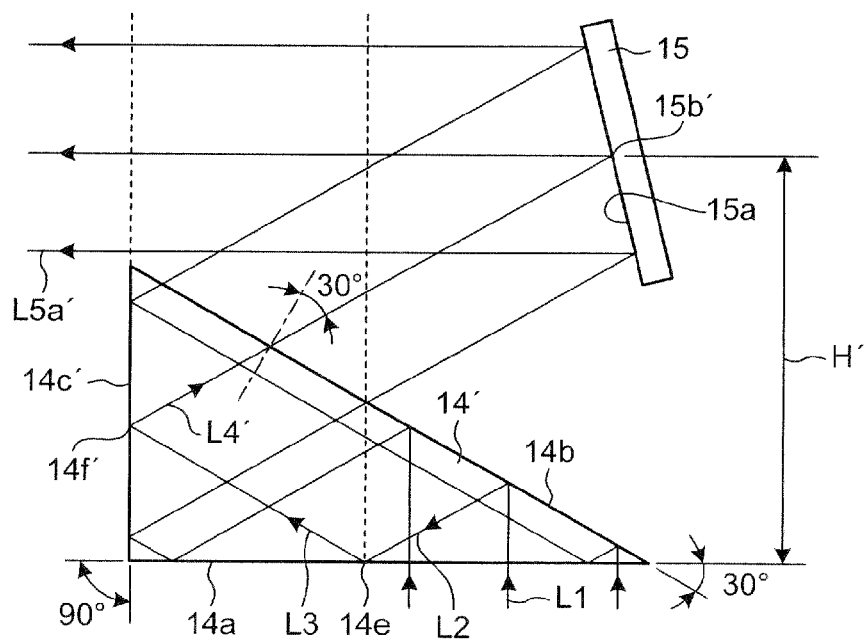

On the other hand, if the deflecting optical system is configured as shown in FIG. 4B, for example, though the height of the eyepoint can be further lowered in comparison with the configuration of FIG. 4A, the light path length to the binocular unit 9 increases. In a deflecting prism 14' which replaces the deflecting prism 14 in the configuration of FIG. 4B, an angle between a third reflecting plane 14*c*' and the first reflecting plane 14*a* is 90° which is smaller than the angle between the third reflecting plane 14*c* and the first reflecting plane 14*a*. An axial observation light L4' reflected by the third reflecting plane 14*c*' is emitted 30° clockwise from the normal line of the second reflecting plane 14*b* in FIG. 4B. A reflecting point 15*b*' of the axial observation light L4' on the reflecting plane 15*a* is arranged outside the range between the reflecting point 14*e* on the first reflecting plane 14*a* and a reflecting point 14*f*' on the third reflecting plane 14*c*' in a direction of the first reflecting plane 14*a* so that the plane mirror 15 is arranged at such a position that a lower edge L5*a*' of a light flux of the observation light reflected by the reflecting plane 15*a* is not eclipsed (shaded) by an upper edge or the like of the deflecting prism 14'. Further, a height H' of the reflecting point 15*b*' from the first reflecting plane 14*a* is lower than the height H of the reflecting point 15*b*.

On the other hand, if the deflecting optical system is configured as shown in FIG. 4C, for example, though the optical path length of the observation light to the binocular unit 9 can be shortened in comparison with that in the configuration of FIG. 4A, the eyepoint is higher. In a deflecting prism 14" replacing the deflecting prism 14 in the configuration of FIG. 4C, an angle between a third reflecting plane 14*c*" and the first reflecting plane 14*a* is 120 ° which is larger than the angle between the third reflecting plane 14*c* and the first reflecting plane 14*a*. Thus, an axial observation light L4" reflected by the third reflecting plane 14*c*" is emitted 30 counter-clockwise from the normal line of the second reflecting plane 14*b*. A reflecting point 15*b*" of the axial observation light L4" on the reflecting plane 15*a* is arranged above the reflecting point 14*f*" on the third reflecting plane 14*c*" at a height H" higher than the height H of the reflecting point 15*b* so that the plane mirror 15 is arranged at such a position that a lower edge L5*a*" of a light flux of the observation light reflected by the reflecting plane 15*a* is not eclipsed (shaded) by an upper edge or the like of the deflecting prism 14".

For the simplicity of description, the axial observation lights L4' and L4" are described as not to be refracted by the second reflecting plane 14*b* in FIGS. 4B and 4C. However, even when there is an influence of refraction, the height of the eyepoint and the light path length of the observation light still remain to vary according to the change in the inclination angle of the third reflecting plane 14*c*. Further, the refraction of the axial observation lights L4' and L4" by the second reflecting plane 14*b* may cause chromatic aberration which can be an additional problem. Hence, it is preferable that the third reflecting plane 14*c* reflects the axial observation light L4 in a direction perpendicular to the second reflecting plane 14*b* as shown in FIG. 4A.

In the above description, the angle between the first reflecting plane 14*a* and the second reflecting plane 14*b* of the deflecting prism 14 is 30°. This angle, however, is not limited to 30° and can be set to various angles. However, to make the axial observation light L2 reflected by the second reflecting plane 14*b* reflected totally by the first reflecting plane 14*a*, it is preferable that an angle φ between the first reflecting plane 14*a* and the second reflecting plane 14*b* in a portion reflecting the observation light therebetween satisfy a following formula (1), where n represents refractive index of the deflecting prism 14 (i.e., refractive index of a glass material). Further, to make the axial observation light L2 reflected by the second reflecting plane 14*b* incident on the first reflecting plane 14*a* at an angle, the angle φ may be larger at least than 45° (φ<45°).

$$\phi \geq \sin^{-1}(1/n)/2 \tag{1}$$

On the other hand, an angle φ between the first reflecting plane 14*a* and the third reflecting plane 14*c* in a portion reflecting the observation light therebetween is preferably set to an angle satisfying a following formula (2) based on the angle φ so as to make the axial observation light L4 reflected by the third reflecting plane 14*c* incident on the second reflecting plane 14*b* perpendicularly and transmitted without refraction.

$$\phi = (\phi + \pi)/2 \tag{2}$$

Specifically, when the refractive index n of the deflecting prism 14 is 1.5 (n=1.5), the angle φ may be set equal to or larger than 20.9° according to the formula (1) (φ≧20.9°). When the angle φ is set to 22.5° (φ=22.5°), the angle φ may be set to 101.25° according to the formula (2) (φ=101.25°).

As described above, the lens barrel 8 according to the first embodiment including the deflecting prism 14 and the plane mirror 15 as the deflecting optical system configured as described above can form the light path for visual observation in a simple and compact manner and reflect the observation light four times in the deflection plane without arranging an element below the imaging lens 13 to form a light path. Further, the lens barrel 8 according to the first embodiment can keep a low eyepoint of the eyepiece 10 and deflect the observation light at a variable depression angle equal to a horizontal angle or a substantially equal to the horizontal angle. Further, since the necessary light path length of the observation light to the binocular unit 9 is shortened, the lens barrel 8 can guide the observation light to the binocular unit 9 via the conventional, standard imaging lens 13 without the need of a relay lens. Further, since the axial observation light L4 reflected by the third reflecting plane 14c is incident on the second reflecting plane 14b perpendicularly, the lens barrel 8 can guide the observation light to the binocular unit 9 without causing the chromatic aberration.

Still further, since the plane mirror 15 which rotates to change the depression angle is arranged right in front of the binocular unit 9, the lens barrel 8 can make a portion which rotates in conjunction with the binocular unit 9 smaller and lighter. At the same time, the lens barrel 8 can make the linked rotation mechanism which rotates the binocular unit 9 and the plane mirror 15 in conjunction with each other smaller. Thus, the lens barrel 8 can reduce the rigidity of the linked rotation mechanism and the resistance against rotation moment, for example. Further, with the simplification of the configuration of the deflecting optical system, the reduced number of elements of the deflecting optical system, and the simplification and downsizing of the linked rotation mechanism, the manufacturing cost of the lens barrel 8 as a whole can be reduced.

Figure 5:
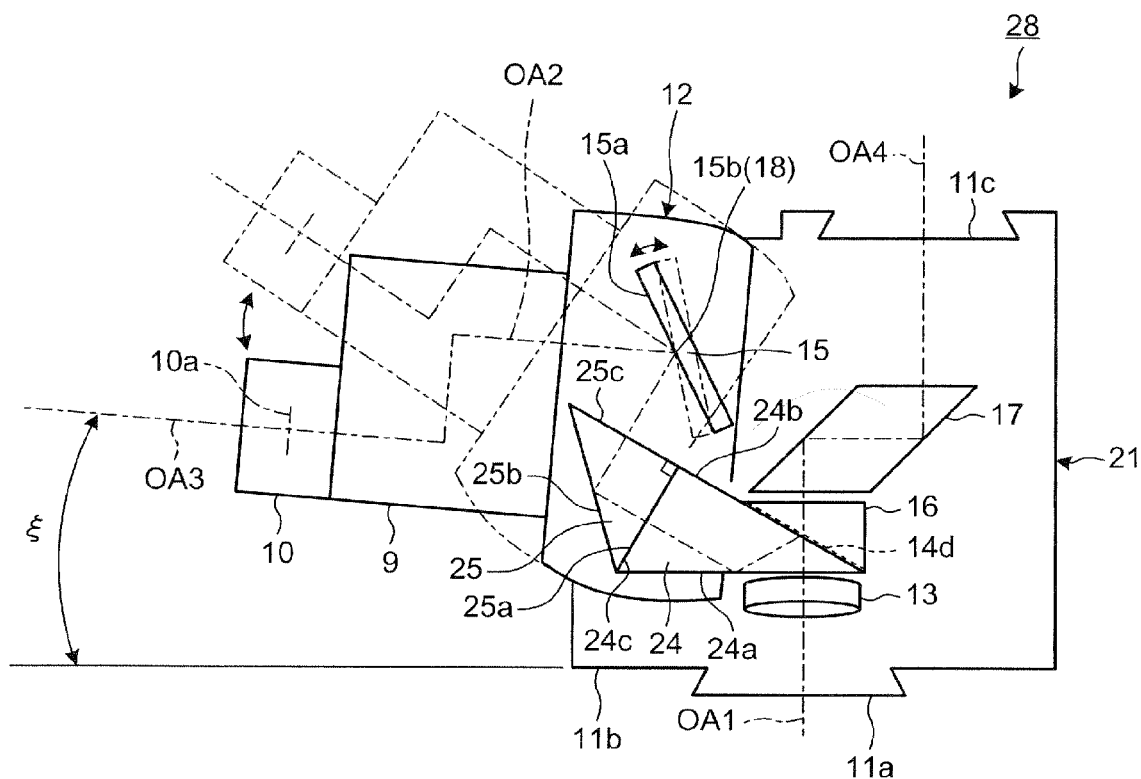
FIG. 5 is a diagram of an internal configuration of a microscope lens barrel according to a first modification of the first embodiment.

A first modification of the microscope lens barrel and the microscope according to the first embodiment will be described. FIG. 5 shows an internal configuration of a lens barrel 28 which is a microscope lens barrel according to the first modification. As shown in FIG. 5, the lens barrel 28 basically has the same configuration as the lens barrel 8 though including a fixed unit 21 in place of the fixed unit 11. The fixed unit 21 basically has the same configuration as the fixed unit 11 though including deflecting prisms 24 and 25 in place of the deflecting prism 14. In other respects, the lens barrel 28 has the same configuration as the lens barrel 8, and the same elements will be denoted by the same reference characters. The microscope according to the first modification basically has the same configuration as the microscope 100, though including the lens barrel 28 in place of the lens barrel 8.

The deflecting prisms 24 and 25 are formed like two divided portions of the deflecting prism 14 and bonded at the dividing surfaces with each other to form one piece. Specifically, the deflecting prism 24 has a right-triangular cross-section surrounded by a first reflecting plane 24a, a second reflecting plane 24b, and a transmitting plane 24c which corresponds to the dividing surface, whereas the deflecting prism 25 has a right-triangular cross-section surrounded by an incident plane 25a which corresponds to the dividing surface, a third reflecting plane 25b, and an emitting plane 25c. The deflecting prisms 24 and 25 are bonded with each other at the transmitting plane 24c and the incident plane 25a, and form the same shape as the deflecting prism 14 as a whole.

In the deflecting prism 24, the first reflecting plane 24a is arranged perpendicularly to the optical axis OA1, and the first reflecting plane 24a, the second reflecting plane 24b, and the transmitting plane 24c are each arranged perpendicularly to the deflection plane which corresponds to the paper surface of FIG. 5. Further, the partial reflecting film 14d is attached on the second reflecting plane 24b similarly to the second reflecting plane 14b of the deflecting prism 14, and the beam-splitting prism 16 is bonded to the deflecting prism 24 via the partial reflecting film 14d. The second reflecting plane 24b and the transmitting plane 24c respectively form an angle of 30° and 60° with the first reflecting plane 24a.

In the deflecting prism 25, the incident plane 25a, the third reflecting plane 25b, and the emitting plane 25c are each arranged perpendicularly to the deflection plane. The incident plane 25c is flush with the second reflecting plane 24b. The incident plane 25a and the emitting plane 25c each form an angle of 45° with the third reflecting plane 25b.

In the deflecting prisms 24 and 25, the axial observation light L1 coming along the optical axis OA1 is transmitted by the first reflecting plane 24a perpendicularly and is incident on the second reflecting plane 24b. The second reflecting plane 24b reflects the axial observation light L1 at a predetermined reflectance ratio and makes a reflected light as the axial observation light L2 incident on the first reflecting plane 24a at an angle. The first reflecting plane 24a totally reflects the axial observation light L2 and makes the reflected light as the axial observation light L3 incident on the transmitting plane 24c perpendicularly. After being transmitted through the transmitting plane 24c and the incident plane 25a perpendicularly, the axial observation light L3 is incident on the third reflecting plane 25b. The third reflecting plane 25b totally reflects the axial observation light L3 and makes the reflected light as the axial observation light L4 incident on the emitting plane 25c perpendicularly and emitted from the emitting plane 25c. Thereafter, the axial observation light L4 emitted from the emitting plane 25c is reflected by the plane mirror 15 similarly to the light in the lens barrel 8, and becomes incident on the binocular unit 9.

Thus, by using the deflecting prisms 24 and 25 in place of the deflecting prism 14, the lens barrel 28 can deflect the observation light similarly to the lens barrel 8 including the deflecting prism 14, and the deflecting optical system as a while including the plane mirror 15 can make the observation light incident on the binocular unit 9 similarly to the optical system including the deflecting prism 14. Thus, the lens barrel 28 can exert the similar effect to the lens barrel 8.

Further, since the deflecting prisms 24 and 25 of the lens barrel 28 are configured with conventional, general prisms, namely, a right angle prism having inner angles of 30° and 60°, and a right angle prism having inner angles of 45°, the deflecting prisms 24 and 25 can be processed/manufactured with high precision at lower manufacturing cost in comparison with the not-commonly-used, triangular deflecting prism 14 having an inner angle of 105°.

In the first modification, the deflecting prisms 24 and 25 are bonded at the transmitting plane 24c and the incident plane 25a to form an integral piece. The deflecting prisms 24 and 25, however, may be arranged separately without being integrated. When arranged separately, the incident plane 25a and the emitting plane 25c may be arranged parallel to the transmitting plane 24c and the second reflecting plane 24b, respectively.

Figure 6:
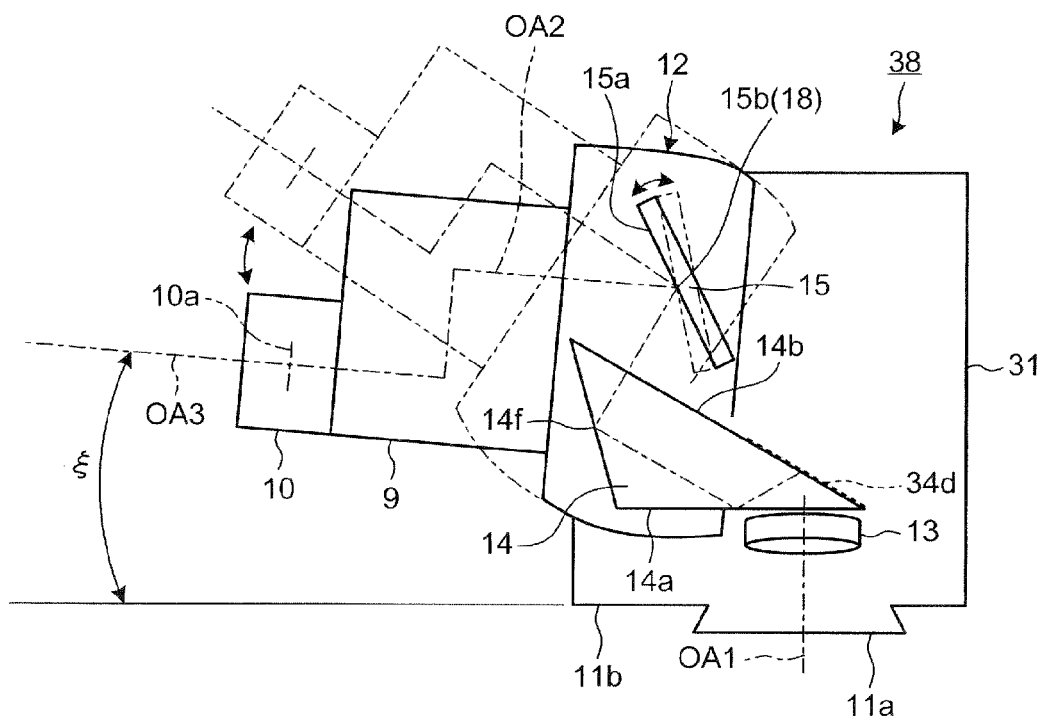
FIG. 6 is a diagram of an internal configuration of a microscope lens barrel according to a second modification of the first embodiment.

A second modification of the microscope lens barrel and the microscope according to the first embodiment will be described. FIG. 6 shows an internal configuration of a lens barrel 38 which is a microscope lens barrel according to the second modification. As shown in FIG. 6, the lens barrel 38 basically has the same configuration as the lens barrel 8 though including a fixed unit 31 in place of the fixed unit 11. The fixed unit 31 basically has the same configuration as the fixed unit 11 though the beam-splitting prism 16, the rhomboid prism 17, and the camera attachment 11c are removed. Further, a high-reflectance film 34d is attached on the second reflecting plane 14b of the deflecting prism 14 in place of the partial reflecting film 14d. In other respects, the lens barrel 38 has the same configuration as the lens barrel 8, and the same elements will be denoted by the same reference characters. The microscope according to the second modification basically has the same configuration as the microscope 100 though including the lens barrel 38 in place of the lens barrel 8.

The high-reflectance film 34d is a metallic reflective film, such as silver coating. The second reflecting plane 14b on which the high-reflectance film 34d is attached reflects incident light at a high reflectance ratio. For example, the second reflecting plane 14b reflects substantially 100% of the light with the exception of absorption loss and the like. Therefore, the second reflecting plane 14b can reflect substantially all the observation light transmitted through the first reflecting plane 14a and make the reflected light incident on the first reflecting plane 14a at an angle. Thus, the lens barrel 38 can use substantially all the observation light coming from the objective lens 7 for the visual observation through the eyepiece 10 so as to allow for an observation of a bright observation image.

Further, since the observation light does not pass through the second reflecting plane 14b in the lens barrel 38, the beam-splitting prism 16 and the rhomboid prism 17 are removed and the light path for camera observation is not formed. Further, since there is no light path for camera observation, the camera attachment is also removed. Thus, as a lens barrel dedicated to the visual observation, the lens barrel 38 has a simpler and more compact configuration and a lower manufacturing cost than the lens barrels 8 and 28.

Figure 7:
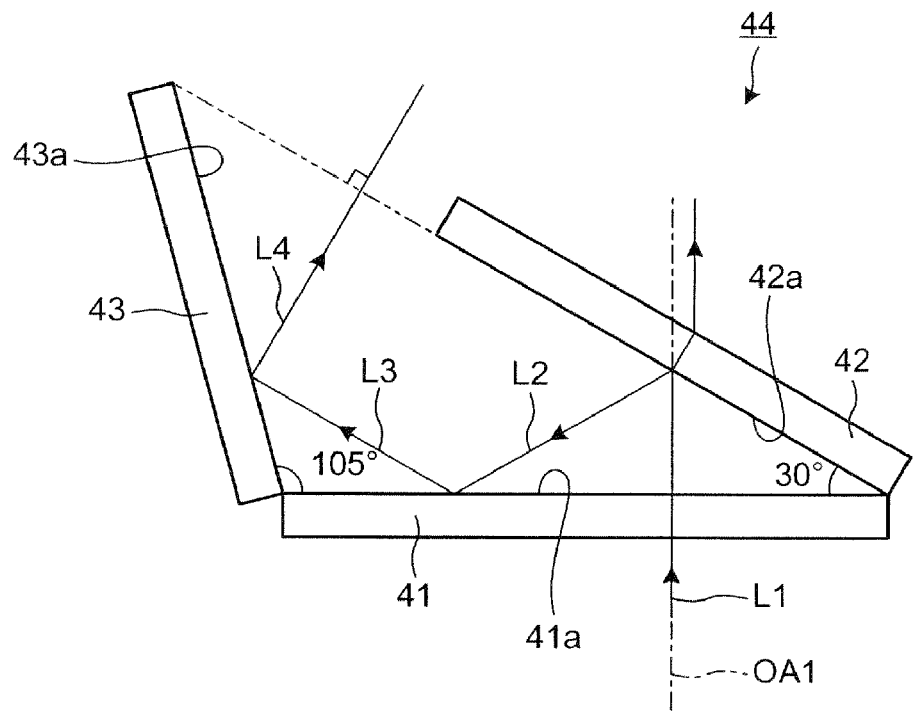
FIG. 7 is a diagram of a configuration of a deflecting mirror provided in a microscope lens barrel according to a third modification of the first embodiment.

A third modification of the microscope lens barrel and the microscope according to the first embodiment will be described. FIG. 7 shows a configuration of a deflecting mirror 44 included in a microscope lens barrel according to the third modification. The deflecting mirror 44 is employed in place of the deflecting prism 14 of the lens barrel 8 or the deflecting prisms 24 and 25 of the lens barrel 28. A microscope according to the third modification basically has the same configuration as the microscope 100 though including a microscope lens barrel including the deflecting mirror 44 in place of the lens barrel 8.

The deflecting mirror 44 includes partial reflecting mirrors 41 and 42 and a high-reflectance mirror 43 as shown in FIG. 7. The partial reflecting mirrors 41 and 42 include a reflecting plane 41a and a reflecting plane 42a, respectively, as a first reflecting plane and a second reflecting plane. The high-reflectance mirror 43 includes a reflecting plane 43a which serves as a third reflecting plane. In the deflecting mirror 44, the reflecting plane 41a is arranged perpendicularly to the optical axis OA1 and the reflecting planes 41a, 42a, and 43a are each arranged perpendicularly to a deflection plane including the optical axis OA1. The deflection plane corresponds to the paper surface of FIG. 7. Further, the reflecting planes 42a and 43a respectively form an angle of 30° and 105° with the reflecting plane 41a.

In the deflecting mirror 44, the reflecting plane 41a transmits the axial observation light L1 which comes along the optical axis OA1 from the bottom side of FIG. 7. The reflecting plane 42a reflects the axial observation light L1 at a predetermined reflectance ratio to make the reflected light as the axial observation light L2 incident on the reflecting plane 41a at an angle, while transmitting the axial observation light L1 at a predetermined transmittance. The reflecting plane 41a reflects the axial observation light L2 and makes the reflected light as the axial observation light L3 incident on the reflecting plane 43a. The reflecting plane 43a reflects the axial observation light L3 and makes the reflected light as the axial observation light L4 emitted perpendicularly to the reflecting plane 42a. Thereafter, the axial observation light L4 is reflected by the plane mirror 15 and becomes incident on the binocular unit 9, similarly to the light in the lens barrel 8 or 28.

Thus, the deflecting mirror 44 can deflect the observation light similarly to the deflecting prism 14 and the deflecting prisms 24 and 25, and the deflecting optical system as a whole including the plane mirror 15 can make the observation light incident on the binocular unit 9 similarly to the optical system including the deflecting prism 14. Thus, the microscope lens barrel including the deflecting mirror 44 can exert a similar effect as that in the lens barrel 8 with respect to the light path for visual observation.

Further, the microscope lens barrel including the deflecting mirror 44 can form the light path for camera observation similarly to the lens barrel 8 or 28, if the beam-splitting prism 16 is removed from the optical axis OA1 which serves as a light transmitting path of the partial reflecting mirror 42 and the rhomboid prism 17 is placed instead. Further, when the partial reflecting mirror 42 is a high-reflectance mirror, the deflecting mirror 44 can replace the deflecting prism 14 of the lens barrel 38 which does not have a light path for camera observation.

In the deflecting mirror 44, the angle between the reflecting plane 41a and the reflecting plane 43a is 105°, and the angle between the reflecting plane 41a and the reflecting plane 42a is 30°, and the axial observation light L4 is emitted in a direction perpendicular to the reflecting plane 42a. In the deflecting mirror 44, however, there is no boundary surface that causes light refraction on the light emitting path of the axial observation light L4, in other words, there is no boundary surface which can cause chromatic aberration, unlike the deflecting prism 14. Therefore, the axial observation light L4 is not necessarily emitted in a direction perpendicular to the reflecting plane 42a. Hence, a condition different from that defined by the formula (2) may be set for the angle between the reflecting plane 41a and each of the reflecting plane 42a and the reflecting plane 43a so that the axial observation light L4 is emitted not in a direction perpendicular to the reflecting plane 42a but in a direction substantially perpendicular to the reflecting plane 42a. On the other hand, when the axial observation light L4 is emitted perpendicularly to the reflecting plane 42a, it is possible to arrange a larger partial reflecting mirror 42 and make the axial observation light 4 transmitted through the partial reflecting mirror 42.

Figure 8:
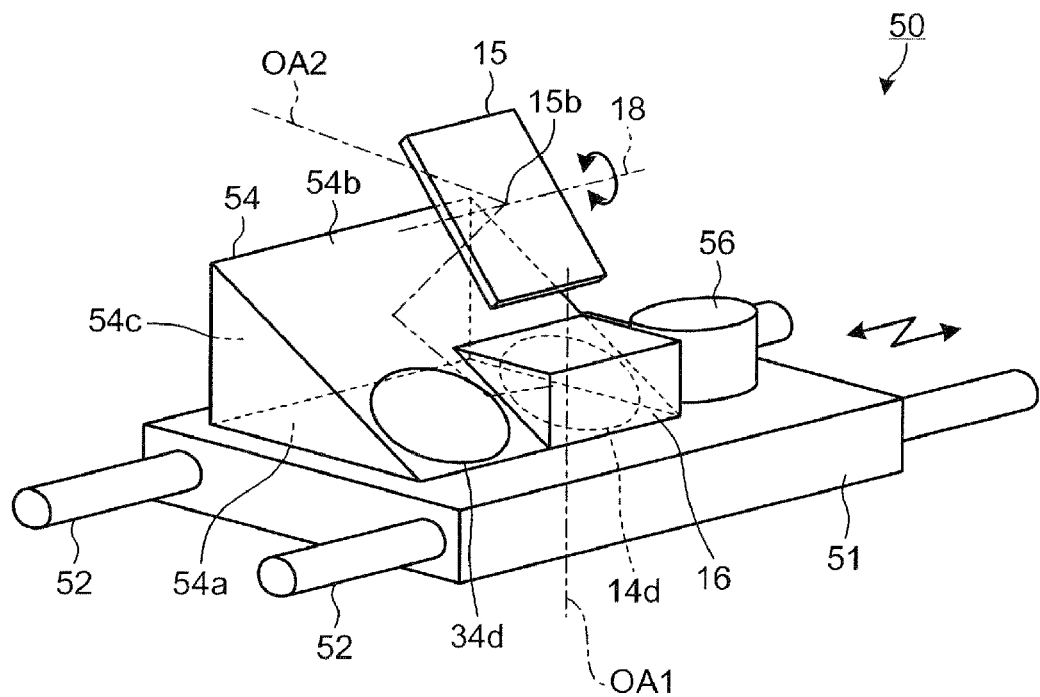
FIG. 8 is a perspective view of a configuration of a light-path switching unit provided in a microscope lens barrel according to a second embodiment of the present invention.

A microscope lens barrel and a microscope according to a second embodiment of the present invention will be described. FIG. 8 is a perspective view of a light-path switching unit 50 included in the microscope lens barrel according to the second embodiment. The light-path switching unit 50 is configured mainly with a light-path switching optical system and a light-path switching mechanism which drives the light-path switching optical system. The light-path switching optical system includes the deflecting optical system configured with a deflecting prism 54 and the plane mirror 15, the beam-splitting prism 16, and a light-path-length correcting glass 56. The light-path switching mechanism includes a slider 51 on which the light-path switching optical system is mounted and a guide 52 which guides the slider 51. Elements of the second embodiment common to those in the first embodiment will be denoted by the same reference characters.

The microscope lens barrel according to the second embodiment basically has the same configuration as the lens barrel 8, for example, and further includes the light-path switching optical system in place of the deflecting prism 14, the plane mirror 15, and the beam-splitting prism 16. The microscope according to the second embodiment basically has the same configuration as the microscope 100, though including the microscope lens barrel including the light-path switching unit 50 in place of the Lens barrel 8.

The deflecting prism 54 has the same triangular cross-section as that of the deflecting prism 14 surrounded by a first reflecting plane 54a, a second reflecting plane 54b, and a third reflecting plane 54c. The deflecting prism 54 is fixed on the slider 51. The first reflecting plane 54a is arranged perpendicularly to the optical axis OA1 and to a deflection plane including the optical axis OA1 and perpendicular to the second reflecting plane 54b. The third reflecting plane 54c is arranged perpendicularly to the deflection plane. The partial reflecting film 14d and the high-reflectance film 34d are attached on the second reflecting plane 54b side by side in a direction perpendicular to the deflection plane and running along the optical axis OA1. Further, the beam-splitting prism 16 is bonded via the partial reflecting film 14d to the second reflecting plane 54b on which the partial reflecting film 14d is attached.

On the slider 51, the light-path length correcting glass 56 is fixed together with the deflecting prism 54. The light-path length correcting glass 56 is arranged next to the partial reflecting film 14d and the high-reflectance film 34d in the direction perpendicular to the deflection plane. The light-path length correcting glass 56 is a columnar glass block having the same light path length as from the first reflecting plane 54a to the upper surface of the beam-splitting prism 16 along the optical axis OA1.

The slider 51 is a flat plate-like member of an optically transparent material such as glass. The slider 51 is supported by two guides 52 that penetrate the slider 51 in a direction perpendicular to the deflection plane, and is movable in this direction. When guided and moved by the guides 52, the slider 51 moves the deflecting prism 54 and the light-path-length correcting glass 56 in a direction perpendicular to the deflection plane so as to place one of the partial reflecting film 14d, the high-reflectance film 34d, and the light-path-length correcting glass 56 selectively on the optical axis OA1. There is a gap (not shown) between the upper surface of the slider 51 and the first reflecting plane 54a so that the first reflecting plane 54a can achieve total reflection.

When the partial reflecting film 14d and the beam-splitting prism 16 are arranged on the optical axis OA1 in the light-path switching unit 50 configured as described above, as shown in FIG. 8, the deflecting prism 54 reflects the observation light incident along the optical axis OA1 via the slider 51 at a predetermined reflectance ratio similarly to the deflecting prism 14 of the lens barrel 8, and emits the reflected light to the plane mirror 15. At the same time, the deflecting prism 54 transmits the observation light at a predetermined transmittance and emits the transmitted light through the beam-splitting prism 16. On the other hand, when the high-reflectance film 34d is arranged on the optical axis OA1, the deflecting prism 54 reflects substantially all the observation light incident along the optical axis OA1 similarly to the deflecting prism 14 of the lens barrel 38, and emits the reflected light to the plane mirror 15. Thus, the microscope lens barrel including the light-path switching unit 50 can guide the observation light to the binocular unit 9 similarly to the lens barrel 8 or 38 by appropriately switching the arranged positions of the deflecting prism 54 by the slider 51.

Further, when the light-path-length correcting glass 56 is arranged on the optical axis OA1 in the light-path switching unit 50, the observation light incident along the optical axis OA1 is transmitted along the optical axis OA1 as it is and guided to the light path for camera observation. Thus, the microscope lens barrel including the light-path switching unit 50 can use all the observation light for camera observation, and allows for an imaging of a bright observation image. Further, the microscope lens barrel can easily switch over the visual observation, the camera observation, and parallel use of the visual observation and the camera observation by appropriately switching the arranged positions of the deflecting prism 54 and the light-path-length correcting glass 56 by the slider 51.

In the above description, the observation light comes into the deflecting prism 54 or the light-path-length correcting glass 56 after being transmitted through the slider 51. Alternatively, however, penetrating holes may be formed in portions of the slider 51 corresponding to the positions of the optical axis 1 in the partial reflecting film 14d, the high-reflectance film 34d, and the light-path-length correcting glass 56, so that the observation light comes into the deflecting prism 54 and the light-path-length correcting glass 56 through the penetrating holes.

Figure 9:
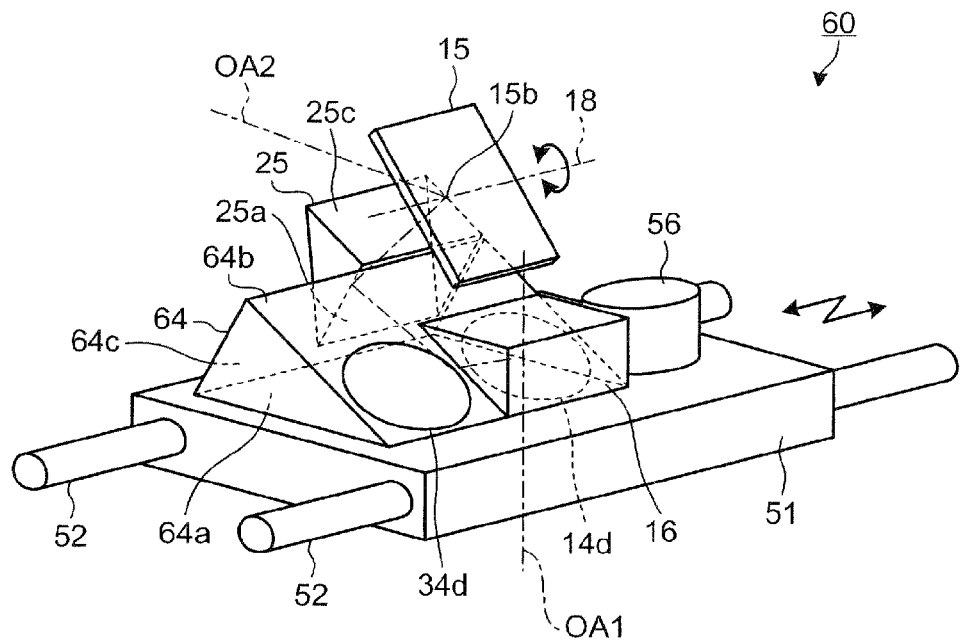
FIG. 9 is a perspective view of a configuration of a light-path switching unit provided in a microscope lens barrel according to a modification of the second embodiment.

A modification of the microscope lens barrel and the microscope according to the second embodiment will be described. FIG. 9 shows a configuration of a light-path switching unit 60 included in a microscope lens barrel of the modification. As shown in FIG. 9, the light-path switching unit 60 basically has the same configuration as the light-path switching unit 50, though including deflecting prisms 64 and 25 in place of the deflecting prism 54. In other respects, the light-path switching unit 60 has the same configuration as the light-oath switching unit 50, and the same elements will be denoted by the same reference characters. A microscope according to the modification basically has the same configuration as the microscope 100, though including a microscope lens barrel including the light-path switching unit 60 in place of the Lens barrel 8.

The deflecting prism 64 has the same triangular cross-section as the deflecting prism 24 surrounded by a first reflecting plane 64a, a second reflecting plane 64b, and a transmitting plane 64c. The deflecting prism 64 is fixed on the slider 51. The first reflecting plane 64a is arranged perpendicularly to the optical axis OA1 and a deflection plane including the optical axis OA1 and perpendicular to the second reflecting plane 64b. The transmitting plane 64c is arranged perpendicularly to the deflection plane. The partial reflecting film 14d, the high-reflectance film 34d, and the beam-splitting prism 16 are arranged on the second reflecting plane 64b similarly to the arrangement on the deflecting prism 54.

Similarly to the light-path switching unit 50, the deflecting prism 64 and the light-path-length correcting glass 56 are arranged side by side on the slider 51 Further, the deflecting prism 25 is arranged close to the deflecting prism 64 with the incident plane 25a and the emitting plane 25c arranged parallel to the transmitting plane 64c and the second reflecting plane 64b, respectively. The deflecting prism 25 is fixed and supported by a supporting mechanism (not shown) on the deflection plane. When guided and moved by the guides 52, the slider 51 moves the deflecting prism 64 and the light-path-length correcting glass 56 in a direction perpendicular to the deflection plane so as to arrange one of the partial reflecting film 14d, the high-reflectance film 34d, and the light-path-length correcting glass 56 on the optical axis OA1 selectively.

As shown in FIG. 9, when the partial reflecting film 14d and the beam-splitting prism 16 are arranged on the optical axis OA1 in the light-path switching unit 60 configured as described above, the deflecting prism 64 reflects the observation light incident along the optical axis OA1 via the slider 51 at a predetermined reflectance ratio similarly to the deflecting prism 24 of the lens barrel 28, and emits the reflected light to the plane mirror 15 via the deflecting prism 25. At the same time, the deflecting prism 64 transmits the observation light at a predetermined transmittance and emits the transmitted light through the beam-splitting prism 16. On the other hand, when the high-reflectance film 34d is arranged on the optical axis OA1, the deflecting prism 64, in cooperation with the deflecting prism 25, reflects substantially all the observation light incident along the optical axis OA1 similarly to the deflecting prism 14 of the lens barrel 38, and emits the reflected light to the plane mirror 15. Thus, the microscope lens barrel including the light-path switching unit 60 can guide the observation light to the binocular unit 9 similarly to the lens barrel 28 or the lens barrel 38 by appropriately switching the arranged positions of the deflecting prism 64 by the slider 51. Further, the microscope lens barrel can easily switch over the visual observation, the camera observation, and the parallel use of the visual observation and the camera observation, by appropriately switching the arranged positions of the deflecting prism 64 and the light-path-length correcting glass 56 by the slider 51 similarly to the microscope lens barrel including the light-path switching unit 50.

Figure 10:
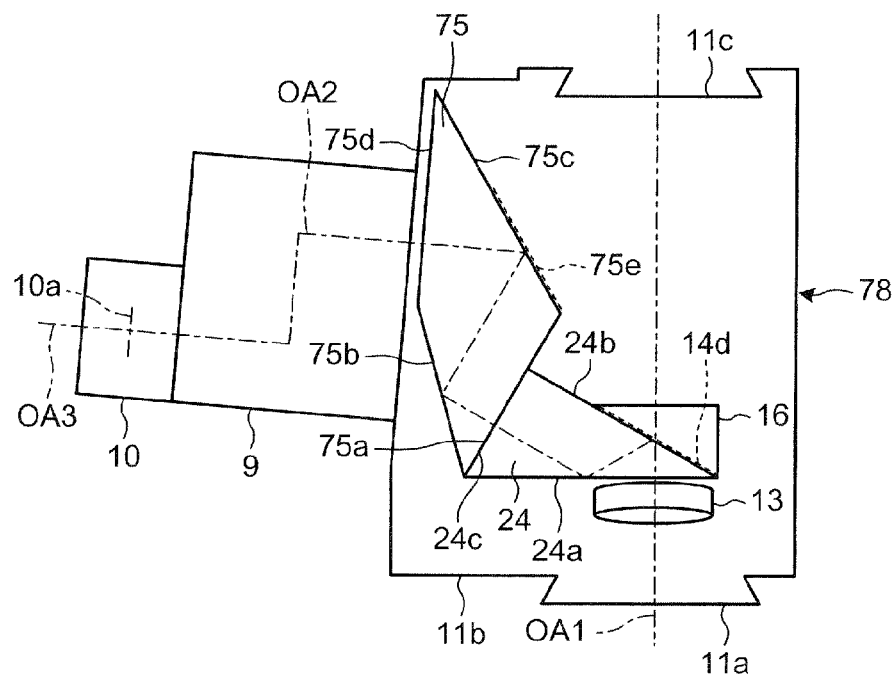
FIG. 10 is a diagram of an inner configuration of a microscope lens barrel according to a third embodiment of the present invention.

A microscope lens barrel and a microscope according to a third embodiment of the present invention will be described. FIG. 10 shows an internal configuration of a lens barrel 78 which is a microscope lens barrel according to the third embodiment. As shown in FIG. 10, the lens barrel 78 includes the imaging lens 13, deflecting prisms 24 and 75 serving as the deflecting optical system, and the beam-splitting prism 16. The imaging lens 13, the deflecting prism 24, and the beam-splitting prism 16 are arranged similarly to those in the lens barrel 28. Elements of the third embodiment common to those in the first embodiment are denoted by the same reference characters.

The deflecting prism 75 has a rectangular cross-section surrounded by an incident plane 75a, a reflecting plane 75b as a third reflecting plane, a reflecting plane 75c as a fourth reflecting plane, and an emitting plane 75d. The incident plane 75a, the reflecting planes 75b and 75c, and the emitting plane 75d are each arranged perpendicular to a deflection plane including the optical axis OA1 and perpendicular to the second reflecting plane 24b (the deflection plane corresponds to the paper surface of FIG. 10). The incident plane 75a is bonded to the transmitting plane 24c of the deflecting prism 24, and an angle between the reflecting plane 75b and the second reflecting plane 24a is set to 105°. The emitting plane 75d is arranged at a predetermined angle relative to the optical axis OA1, i.e., is is arranged parallel to or substantially parallel to the optical axis OA1. A high-reflectance film 75e is attached on the reflecting plane 75c so as to reflect the light incident on the reflecting plane 75c at a high reflectance ratio.

In the deflecting prism 24, the axial observation light L1 coming along the optical axis OA1 is reflected and transmitted by a predetermined ratio at the second reflecting plane 24b on which the partial reflecting film 14d is attached. Light reflected by the second reflecting plane 24b as the axial observation light L2 is reflected by the first reflecting plane 24a similarly to the light in the deflecting prism 24 of the lens barrel 28, and is further emitted from the transmitting plane 24c perpendicularly as the axial observation light L3.

In the deflecting prism 75, the axial observation light L3 emitted through the transmitting plane 24c comes into the deflecting prism 75 from the incident plane 75a perpendicularly. The reflecting plane 75b reflects the axial observation light L3 totally, and makes the reflected light as the axial observation light L4 incident on the reflecting plane 75c. The reflecting plane 75c reflects the axial observation light L4 and makes the reflected light as the axial observation light L5 incident on the incident plane 75d perpendicularly, and makes the axial observation light L5 emitted from the emitting plane 75d.

Thus, the lens barrel 78 can makes the observation light coming along the optical axis OA1 into the deflecting prism 24 incident on the binocular unit 9 within the deflection plane in a predetermined direction perpendicular to or substantially perpendicular to the optical axis OA1, in other words, at a predetermined depression angle which is horizontal or substantially horizontal. Further, the lens barrel 78 can keep the eyepoint of the eyepiece 10 at a low position. Further, the lens barrel 78 can emit a part of the observation light incident on the deflecting prism 24 via the beam-splitting prism 16 along the optical axis OA1 from the camera attachment 11c for the camera observation.

Further, since the depression angle of the lens barrel 78 is fixed, the movable unit 12, the linked rotation mechanism, and the like of the lens barrel 8 and the like are not necessary, and the light path for camera observation can be formed on the optical axis OA1. Therefore, the lens barrel 78 as a whole can be made more compact and simpler in comparison with the lens barrels 8, 28, 38 and the like having variable depression angle.

In the third embodiment, the deflecting prisms 24 and 75 are bonded at the transmitting plane 24c and the incident plane 75a to form an integral piece. The deflecting prisms 24 and 75, however, may be arranged separately with a gap between the transmitting plane 24c and the incident plane 75a.

Exemplary embodiments of the present invention have been described as the first to the third embodiments. The present invention, however, is not limited to the first to the third embodiments described above, and various modifications can be made without departing from the scope of the present invention.

For example, in the first to the third embodiments, the first to the third reflecting planes in the deflecting optical system are formed as the surfaces of the prism or the reflecting plane of the plane mirror. The first to the third reflecting planes, however, may be formed as a combination of a prism and a plane mirror. Specifically, the deflecting prism 25 of the lens barrel 28 may be replaced with the high-reflectance mirror 43 of the deflecting mirror 44. Alternatively, the deflecting prism 24 and the beam-splitting prism 16 of the lens barrel 28 may be replaced with the combination of the partial reflecting mirrors 41 and 42 of the deflecting mirror 44.

Further, in the first embodiment described above, the emitting plane 25c of the lens barrel 28 is flush with the second reflecting plane 24b. These planes, however, may not be flush with each other. As far as these planes are parallel with each other, there can be a step between the emitting plane 25c and the second reflecting plane 24b. Similarly, in the lens barrel 8, there can be a step on the second reflecting plane 14b between a region where the partial reflecting film 14d or the high-reflectance film 34d is attached and a region which serves as a transmitting plane through which the observation light is emitted to the plane mirror 15. Such a step may be similarly formed in the deflecting prism 54 and the deflecting prisms 64 and 25 of the second embodiment.

Further, though the plane mirror 15 in the first and the second embodiments is described as rotating within the angular range close to the horizontal angle, the plane mirror 15 may be made rotatable within a wider angular range. The plane mirror 15 may be made rotatable within such an angular range that the depression angle of a line of vision (i.e., depression angle) of the binocular unit 9 is actually an elevation angle, in other words, that the eyepiece 10 is angled below the horizontal plane.

Further, in the description of the first embodiment, the microscope 100 illuminates the specimen 1 from above by the epi-illumination projecting tube 4. The microscope 100, however, may provide illumination other than epi-illumination. For example, an illumination optical system may be arranged below the stage 2 within the microscope body 3, so that the specimen 1 is illuminated from below. In this case, the epi-illumination projecting tube 4 may be removed from the microscope body 3. When the epi-illumination projecting tube 4 is removed, a spacer or the like having the equivalent height to the epi-illumination projecting tube 4 may be arranged below the lens barrel 8. Then, the eyepoint of the microscope as a whole can be maintained at the same level regardless of the presence/absence of the epi-illumination projecting tube 4.

In the description of each of the embodiments above, the deflecting prisms 14 and 24 are described as deflecting prisms having a triangular cross-section surrounded by the first, the second, and the third reflecting planes 14a, 14b, and 14c and the first, the second, and the third reflecting planes 24a, 24b, and 24c, respectively. However, when the observation light is transmitted as well as reflected at each plane, the planes of the deflecting prisms 14 and 24 may be referred to as first planes 14a and 24a, second planes 14b and 24b, and third planes 14c and 24c.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

(Note 1)

A microscope lens barrel comprising:

a collecting lens; and a deflecting optical system that deflects observation light emitted from the collecting lens, the deflecting optical system including a first reflecting plane that transmits light coming in from one direction and reflects light coming in from another direction at an angle, a second reflecting plane that reflects the observation light transmitted through the first reflecting plane and makes the reflected light incident on the first reflecting plane at an angle, a third reflecting plane that reflects the observation light reflected from the first reflecting plane at a direction perpendicular or substantially perpendicular to the second reflecting plane to a same side as the second reflecting plane relative to the observation light, and a fourth reflecting plane that reflects the observation light reflected by the third reflecting plane in a direction perpendicular or substantially perpendicular to an optical axis of the collecting lens along a deflection plane which includes the optical axis of the collecting lens and perpendicular to the second reflecting plane.

(Note 2)

The microscope lens barrel according to note 1, wherein the fourth reflecting plane reflects an axial observation light of the observation light which is incident on the first reflecting plane along the optical axis of the collecting lens at a point between a reflecting point of the axial observation light on the first reflecting plane and a reflecting point of the axial observation light on the third reflecting plane in a direction perpendicular to the optical axis of the collecting lens.

(Note 3)

The microscope lens barrel according to note 1 or 2, wherein the first reflecting plane, the second reflecting plane, and the third reflecting plane are each arranged on a surface of a deflecting prism, the second reflecting plane reflects the observation light transmitted through the first reflecting plane and coming into the deflecting prism and makes the reflected observation light incident on the first reflecting plane at an angle, the first reflecting plane totally reflects the observation light made incident at the angle by the second reflecting plane, the third reflecting plane reflects the observation light reflected by the first reflecting plane in a direction perpendicular to a transmitting plane of the second reflecting plane so as to emit the reflected observation light from the transmitting plane.

(Note 4)

The microscope lens barrel according to note 3, wherein the transmitting plane is flush with the second reflecting plane.

(Note 5)

The microscope lens barrel according to note 1 or 2, wherein the first reflecting plane and the second reflecting plane are each arranged on a surface of a deflecting prism having a transmitting plane inclined relative to the first reflecting plane by a predetermined angle, the second reflecting plane reflects the observation light transmitted through the first reflecting plane and coming into the deflecting prism and makes the reflected observation light incident on the first reflecting plane at an angle, the first reflecting plane totally reflects the observation light made incident at the angle by the second reflecting plane in a direction perpendicular to the transmitting plane to emit the reflected observation light from the transmitting plane.

(Note 6)

The microscope lens barrel according to any one of notes 1, 2, and 5, wherein the third reflecting plane is arranged on a surface of a triangular prism having an incident plane perpendicular to the observation light reflected from the first reflected plane, and an emitting plane parallel to the second reflecting plane, and the third reflecting plane reflects the observation light reflected by the first reflecting plane and coming into the triangular prism through the incident plane in a direction perpendicular to the emitting plane to emit the reflected observation light from the emitting plane.

(Note 7)

The microscope lens barrel according to note 5, wherein the third reflecting plane is arranged on a surface of a triangular prism having an incident plane bonded to the transmitting plane and an emitting plane parallel to the second reflecting plane, and the third reflecting plane reflects the observation light reflected by the first reflecting plane and coming into the triangular prism through the incident plane in a direction perpendicular to the emitting plane to emit the reflected observation light from the emitting plane.

(Note 8)

The microscope lens barrel according to any one of notes 1 to 7, wherein the fourth reflecting plane is arranged rotatable around a predetermined axis perpendicular to the deflection plane.

(Note 9)

The microscope lens barrel according to note 8, wherein the predetermined axis is arranged on a reflecting point of the axial observation light on the fourth reflecting plane, the axial observation light being light among the observation light incident on the first reflecting plane along the optical axis of the collecting lens.

(Note 10)

The microscope lens barrel according to note 8 or 9, further comprising a binocular unit that is arranged rotatable around the predetermined axis and divides the observation light reflected by the fourth reflecting plane into two, wherein the fourth reflecting plane moves in conjunction with the binocular unit and rotates around the predetermined axis in a same direction with rotation of the binocular unit by half an amount of the rotation of the binocular unit.

(Note 11)

The microscope lens barrel according to any one of notes 1, 2, and 5, wherein the third reflecting plane and the fourth reflecting plane are each arranged on a surface of a rectangular prism having an incident plane perpendicular to the observation light reflected by the first reflecting plane, and an emitting plane perpendicular to the deflection plane and parallel or substantially parallel to the optical axis of the collecting lens, the third reflecting plane reflects the observation light reflected by the first reflecting plane and coming into the rectangular prism through the incident plane, and the fourth reflecting plane reflects the observation light reflected by the third reflecting plane in a direction perpendicular to the emitting plane and emits the reflected observation light from the emitting plane.

(Note 12)

The microscope lens barrel according to note 5, wherein the third reflecting plane and the fourth reflecting plane are each arranged on a surface of a rectangular prism having an incident plane bonded to the transmitting plane and an emitting plane perpendicular to the deflection plane and parallel or substantially parallel to the optical axis of the collecting lens, the third reflecting plane reflects the observation light reflected by the first reflecting plane and coming into the rectangular prism through the incident plane, the fourth reflecting plane reflects the observation light reflected by the third reflecting plane in a direction perpendicular to the emitting plane and emits the reflected observation light from the emitting plane.

(Note 13)

The microscope lens barrel according to any one of notes 1 to 12, wherein the second reflecting plane has a high-reflectance film that reflects at a high reflectance ratio the observation light transmitted through the first reflecting plane.

(Note 14)

The microscope lens barrel according to any one of notes 1 to 12, wherein the second reflecting plane has a partial reflecting film that reflects and transmits the observation light transmitted through the first reflecting plane at a predetermined ratio.

(Note 15)

The microscope lens barrel according to any one of notes 1 to 12, wherein the second reflecting plane includes a high-reflectance film that reflects the observation light transmitted through the first reflecting plane at a high reflectance ratio and a partial reflecting film that reflects and transmits the observation light transmitted through the first reflecting plane at a predetermined ratio, the high-reflectance film and the partial reflecting film being arranged side by side in a direction perpendicular to the deflection plane, the second reflecting plane is movable in the direction perpendicular to the deflection plane, and one of the high-reflectance film and the partial reflecting film is arranged on the optical axis of the collecting lens selectively.

(Note 16)

The microscope lens barrel according to note 15, wherein the second reflecting plane is integral with the first reflecting plane and arranged movable in the direction perpendicular to the deflection plane.

(Note 17)

The microscope lens barrel according to note 15, wherein the second reflecting plane is integral with the first and the third reflecting planes and arranged movable in the direction perpendicular to the deflection plane.

(Note 18)

The microscope lens barrel according to any one of notes 3 to 5, wherein an angle $\phi$ between the first reflecting plane and the second reflecting plane within which the observation light is reflected is set to an angle that satisfies a formula $\phi \geq \sin^{-1}(1/n)/2$ where n is a refractive index of the deflecting prism.

(Note 19)

The microscope lens barrel according to any one of notes 1 to 18, wherein an angle $\phi$ between the first reflecting plane and the third reflecting plane within which the observation light is reflected is set to an angle equal to or substantially equal to an angle that satisfies a formula $\phi=(\phi+\pi)/2$ where $\phi$ is the angle between the first reflecting plane and the second reflecting plane within which the observation light is reflected.

(Note 20)

A microscope comprising a microscope lens barrel according to any one of notes 1 to 19.

What is claimed is:

1. A microscope lens barrel comprising:
    a collecting lens; and
    a deflecting optical system that deflects observation light emitted from the collecting lens, the deflecting optical system including:
        one of a deflecting prism having a triangular cross-section surrounded by first, second, and third planes, and three mirrors respectively having the first, second, and third planes, and
        one of a plane mirror and a deflecting prism each having a fourth plane,
    wherein:
        the first plane transmits the observation light incident from the collecting lens along a first optical axis and reflects the observation light incident at an angle from the second plane along a third optical axis,
        the second plane reflects the light on the first optical axis transmitted through the first plane and makes the reflected light incident on the first plane at the angle along a second optical axis,
        the third plane reflects the light on the third optical axis reflected by the first plane in a direction of a second plane side along a fourth optical axis, and
        the fourth plane reflects the light on the fourth optical axis reflected by the third plane in a direction substantially perpendicular to an optical axis of the collecting lens and in a direction from the optical axis of the collecting lens toward a third plane side along a fifth optical axis.

2. The microscope lens barrel according to claim 1, wherein the observation light incident on the first plane from the collecting lens is incident on the first plane perpendicularly, and the light incident on the first plane at the angle from the second plane is totally reflected by the first plane.

3. The microscope lens barrel according to claim 1, wherein when axial light of the observation light along the optical axis of the collecting lens is referred to as axial observation light, a first imaginary line passing through a reflecting point of the axial observation light on the first plane is parallel to the optical axis of the collecting lens, and a second imaginary line passing through a reflecting point of the axial observation light on the third plane is parallel to the optical axis of the collecting lens, a reflecting point of the axial observation light on the fourth plane is arranged between the first imaginary line and the second imaginary line.

4. The microscope lens barrel according to claim 1, wherein the fourth plane is rotatable around an axis that is perpendicular to the optical axis of the collecting lens, and the direction of the fifth optical axis is changeable by rotating the fourth plane.

5. A microscope lens barrel comprising:
a collecting lens; and
a deflecting optical system that deflects observation light emitted from the collecting lens, the deflecting optical system including:
  a deflecting prism having a triangular cross-section surrounded by first, second, and third planes, an angle between the first plane and the second plane being 30°, and an angle between the first plane and the third plane being 105°, and
  a plane mirror,
wherein:
  the first plane transmits the observation light that passes through the collecting lens and is incident on the first plane, and totally reflects toward a direction of the third plane the observation light that is incident on the first plane from a direction of the second plane,
  the second plane reflects the observation light transmitted through the first plane in a direction of the first plane, and
  the third plane reflects the observation light totally reflected by the first plane in a direction of the plane mirror.

* * * * *